United States Patent [19]

Akira et al.

[11] Patent Number: 4,616,872
[45] Date of Patent: Oct. 14, 1986

[54] EARTH MOVING VEHICLE

[75] Inventors: Takashima Akira; Masahiko Kobayashi; Hitoo Nasu; Yoshishiro Okida, all of Sakai; Kazuhiko Tsuji, Izumi, all of Japan

[73] Assignee: Kubota, Ltd., Osaka, Japan

[21] Appl. No.: 711,874

[22] Filed: Mar. 14, 1985

[30] Foreign Application Priority Data

Nov. 28, 1984 [JP] Japan .............................. 59-181435[U]

[51] Int. Cl.⁴ ............................................. B62D 33/06
[52] U.S. Cl. ................................. 296/190; 180/89.12
[58] Field of Search .............. 296/190; 180/326, 89.12

[56] References Cited

U.S. PATENT DOCUMENTS 3,841,430 10/1974 Babbit, Jr. ............................ 296/190
4,062,582 12/1977 Youmans ............................... 296/190

FOREIGN PATENT DOCUMENTS 650875 3/1979 U.S.S.R. ................................ 296/190

Primary Examiner—Robert R. Song
Attorney, Agent, or Firm—Jordan and Hamburg

[57] ABSTRACT

There is disclosed an earth moving vehicle having a pressure oil tank and a battery arranged longitudinally along one lateral side of a swivel deck. A driver's cabin of the vehicle includes covers for covering the battery and the pressure oil tank. The covers have top surfaces at a certain height to provide a large space for the driver.

2 Claims, 8 Drawing Figures

4,616,872

EARTH MOVING VEHICLE

BACKGROUND OF THE INVENTION

This invention relates to an earth moving vehicle having a pressure oil tank and a battery arranged longitudinally along one lateral side of a swivel deck.

Known earth moving vehicles of this type have a driver's cabin disposed at a lateral side of the swivel deck opposite the pressure oil tank and the battery. Such a construction has a disadvantage that, since the cabin is provided together with the pressure oil tank and battery within a limited transverse dimension of the swivel deck, there is only a small space for the driver which hampers his free movements.

SUMMARY OF THE INVENTION

The object of this invention is to permit the driver to move inside the cabin without difficulty even if the swivel deck has a limited transverse dimension.

In order to achieve this object, an earth moving vehicle according to this invention comprises a driver's cabin extending substantially over an entire transverse dimension of the swivel deck, and covers disposed in the driver's cabin for covering the battery and the pressure oil tank, the covers including top surfaces lower than a height of elbows of a driver seated on a driver's seat. This construction has the following advantages.

The driver's cabin extending substantially over an entire transverse dimension of the swivel deck has a larger inside space than the driver's cabin according to the prior art construction. Furthermore, since the pressure oil tank and the battery disposed in the driver's cabin are covered by the covers, the driver does not get caught by the tank or the battery during his movement. The covers have top surfaces lower than a height of the elbows of the driver seated on the driver's seat, which permits the driver to utilize a space resulting therefrom and move freely within the cabin.

Thus, this invention provides an increased effective space for safe movements of the driver, and greater comfort for the driver, thereby improving his working efficiency in the cabin.

Other advantages of this invention will be apparent from the following description.

BRIEF DESCRIPTION OF THE DRAWINGS

The drawings illustrate earth moving vehicles embodiying this inventio, in which.

DESCRIPTION OF THE PREFERRED EMBODIMENTS

Figure 1:
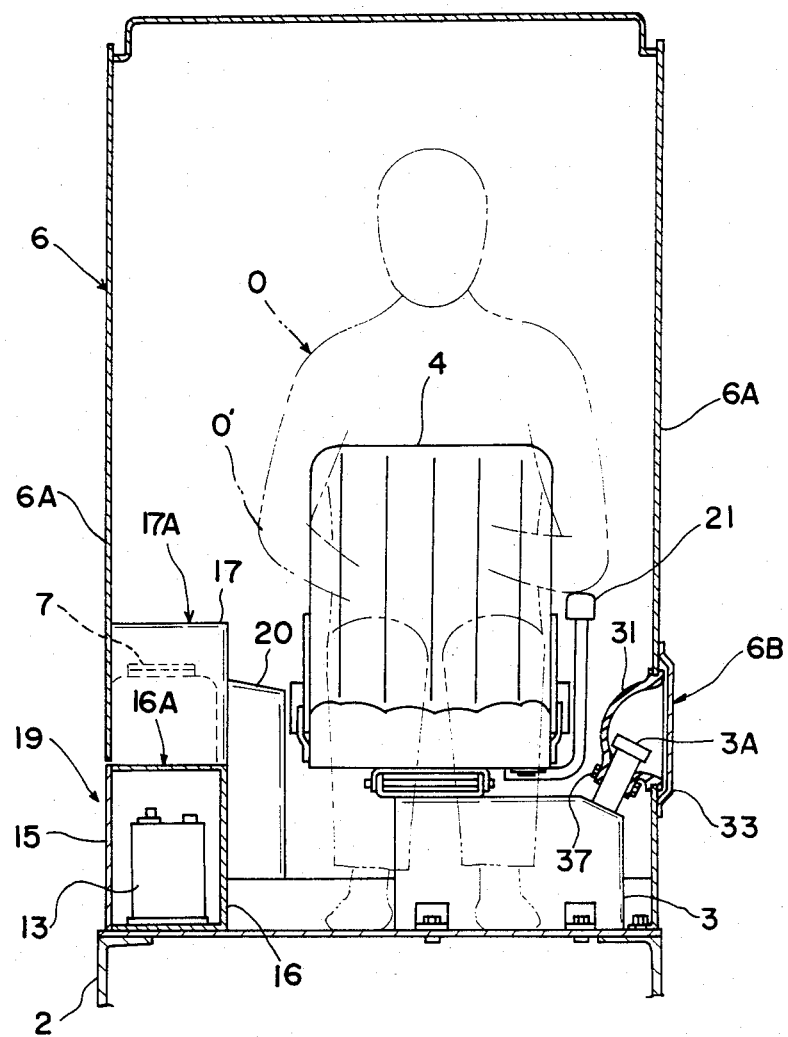
FIG. 1 is a front view partly in section of a driver's cabin.
Figure 2:
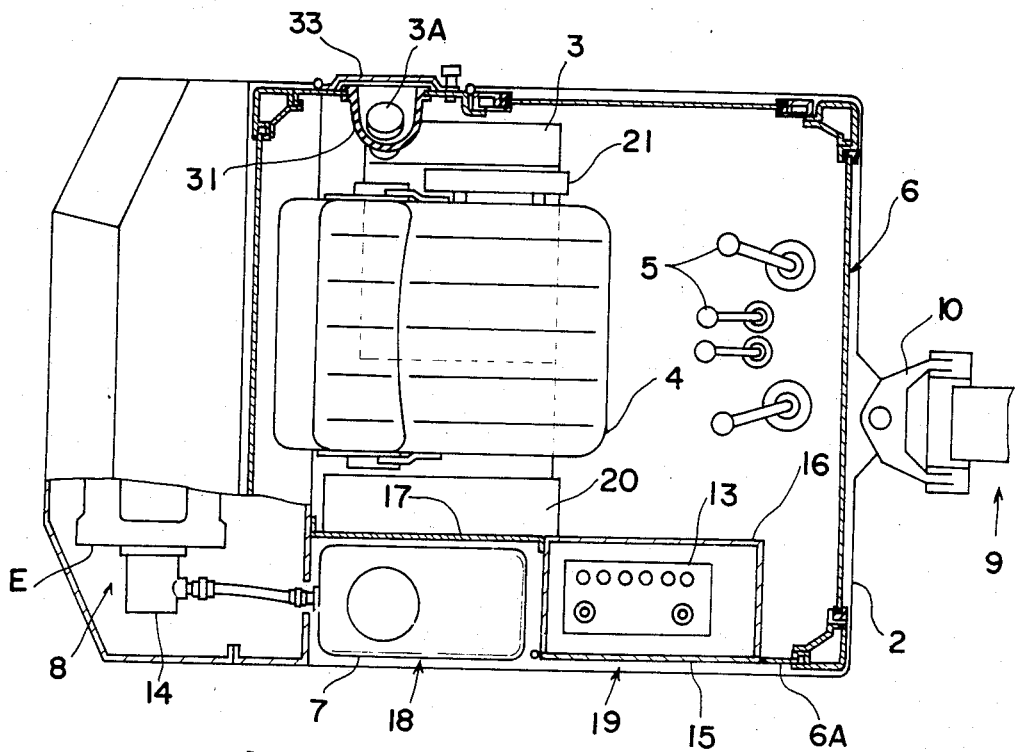
FIG. 2 is a plan view of the cabin with parts of the vehicle omitted.
Figure 3:
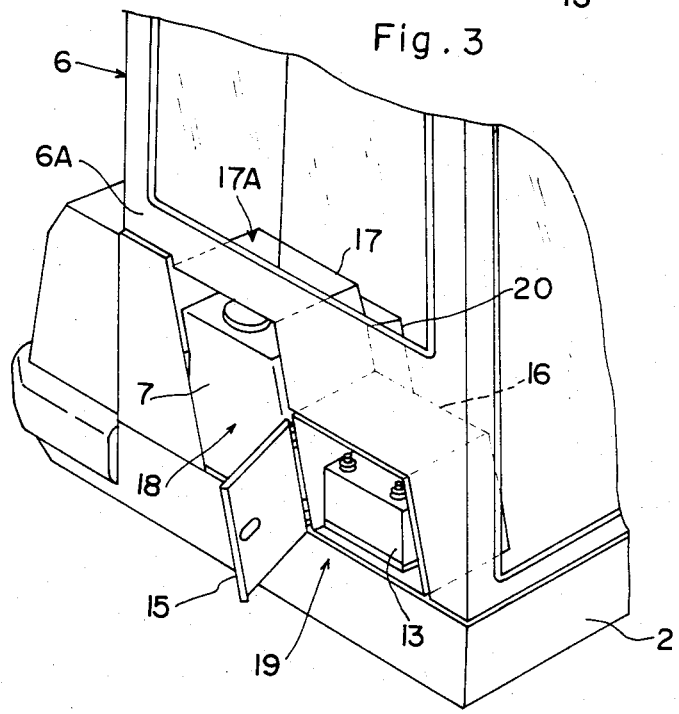
FIG. 3 is a perspective view of one lateral side of the cabin.
Figure 4:
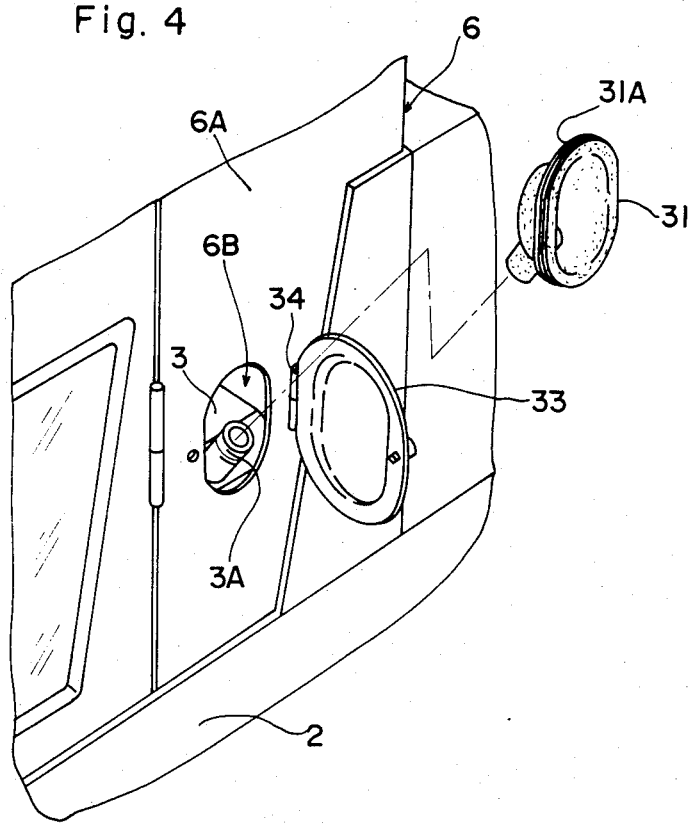
FIG. 4 is a perspective view of the other lateral side of the cabin.
Figure 5:
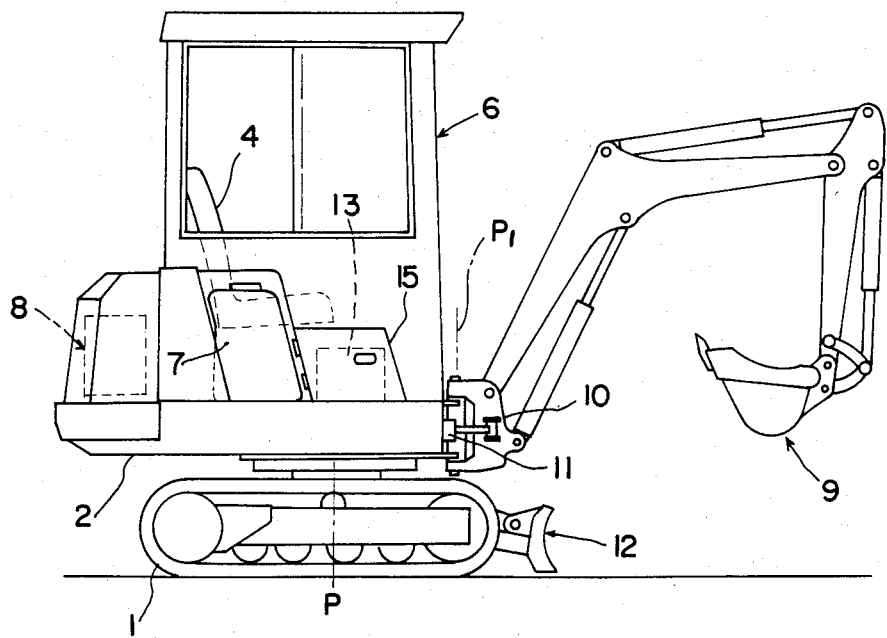
FIG. 5 is a side elevation of the earth moving vehicle.

FIGS. 1 through 5 illustrate a working vehicle embodying this invention, which vehicle is adapted mainly for excavating and earth moving operations. The vehicle comprises crawler traveling apparatus 1 carrying a vehicle frame to which a swivel deck 2 is attached through a rotary joint (not shown) to be swivellable on a vertical axis P. The swivel deck 2 carries a driver's cabin 6 extending substantially over an entire transverse dimension thereof and including a fuel tank 3, a driver's seat 4, and various control levers 5. The driver's cabin 6 further includes a pressure oil tank 7 and a battery 13 arranged along one lateral side of the cabin 2. As seen, the battery 13 is disposed forwardly of the tank 3. A motor section 8 is disposed rearwardly of the driver's cabin 6, which motor section 8 comprises an engine E and a hydraulic pump 14 covered by a bonnet. The vehicle further comprises a backhoe implement 9 connected through a bracket 10 to a forward end of the swivel deck 2, and a bulldozer implement 12 vertically movably attached to the vehicle frame. The backhoe implement 9 is vertically oscillatable and stretchable and bendable, and also swingable to right and left on a vertical axis P1 by a swing cylinder 11.

The battery 13 is disposed forwardly of the pressure oil tank 7 and is contained in a battery case 16 having a lid 15 at a lateral side thereof to open and close the case 16. The pressure oil tank 7 is covered at inner portions thereof opposed to the driver's cabin 6 by an interior cover 17.

A side wall 6A of the driver's cabin 6 along which the pressure oil tank 7 and the battery case 16 are arranged is cut out to define an opening 18 exposing the pressure oil tank 7 outwardly and an opening 19 which is opened and closed by the lid 15 of the battery case 16. The side wall 6A, an exposed lateral face of the pressure oil tank 7, and the lid 15 of the battery case 16 are all arranged to lie substantially on the same plane.

The interior cover 17 in the driver's cabin 6 has a top surface 17A which is, as best seen in FIG. 1, substantially equal in height to or lower than tops of armrests 21 provided laterally of the driver's seat 4. That is to say the top surface 17A is lower than the elbows 0' of the driver 0 seated on the seat 4. The battery case 16 has a top surface 16A lower than the top surface 17A of hte interior cover 17. Thus, the interior cover 17 and the battery case 16 do not interfere with movements of the driver during his control operation of the vehicle and provide an increased effective space in the driver's cabin 6.

A console box 20 including instruments and switches is provided on lateral sides of the interior cover 17 and the battery case 16 opposed to the driver's seat 4. The console box 20 has a top surface also lower than the top surface 17A of the interior cover 17.

The fuel tank 3 is disposed under the driver's seat 4. A side wall 6A of the driver's cabin 6 opposite the pressure oil tank 7 and the battery case 16 defines an opening 6B to permit access to a refilling port 3A of the fuel tank 3. A rubber partition element 31 is provided to extend between the refilling port 3A and the opening 6B to define a refilling passage sealed airtight to the interior of the driver's cabin 6. The rubber element 31 has one end thereof fitted on the refilling port 3A and secured thereto by a clamping band 37, thereby the rubber element 31 being rigidly connected to the refilling port 3A in a leakproof manner, and the other end thereof including a tubular periphery defining a peripheral groove 31A which is engaged by a peripheral edge of the opening 6B. A cover 33 is hinged as at 34 to the side wall 6A to open and close the opening 6B.

The described construction may be modified as follows: The cover 33 may be removably attached to the rubber partition element 31. The cover 33 will serve the purpose if it can close the opening 6B, and therefore the opening 6B is named herein an opening having an opening and closing cover. The rubber partition element 31 may be replaced by a partition element formed of a synthetic resin material. These elements are collectively named a resin partition element herein.

The lid 15 of the battery case may be attached to the side wall 6A of the cabin 6 to permit access to the battery 13. Thus, the opening 19 is just called an access opening having an opening and closing lid. The battery 13 may not be contained in the battery case 16, but instead may just be covered at inner portions thereof by the cover 17. Thus, the term cover herein used will be understood to include the battery case 16.

Figure 6:
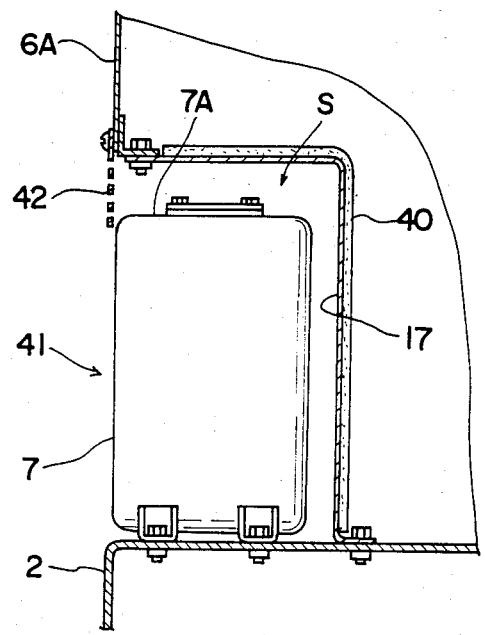
FIG. 6 is a partly broken away view showing a modification.
Figure 7:
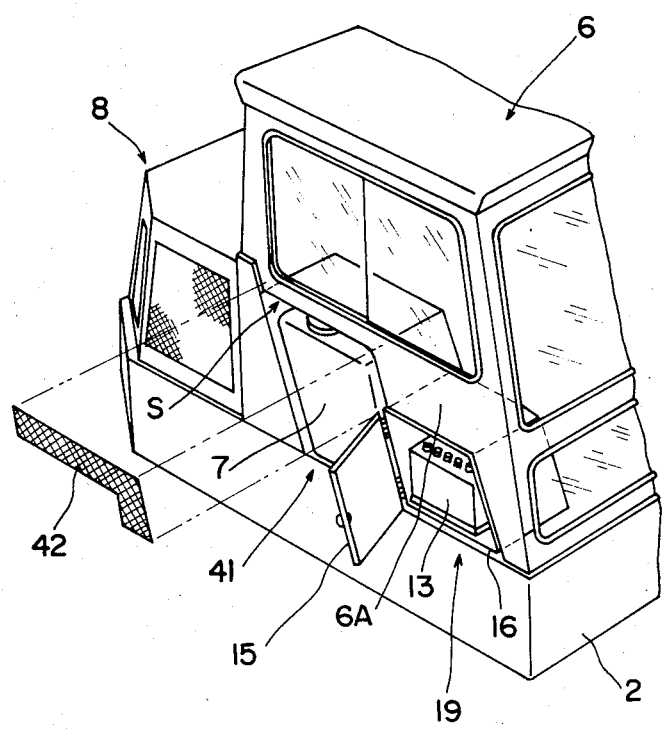
FIG. 7 is a perspective view showing a further modification.

A further embodiment will now be described with reference to FIGS. 6 through 8. As shown in FIGS. 6 and 7, the pressure oil tank 7 is covered at portions thereof opposed to the driver's cabin 6 by a cover 17 surfacially coated with an insulating material 40 to restrain heat radiation from the pressure oil tank 7 heating the interior of the driver's cabin 6. A space S is defined between the cover 17 and a top surface 7A and a lateral surface of the pressure oil tank 7. It is in the interest of good appearance that the space S is invisible from outside. For this purpose an expanded metal 42 having good airpermeability is attached to the side wall 6A to cover up the space S.

Figure 8:
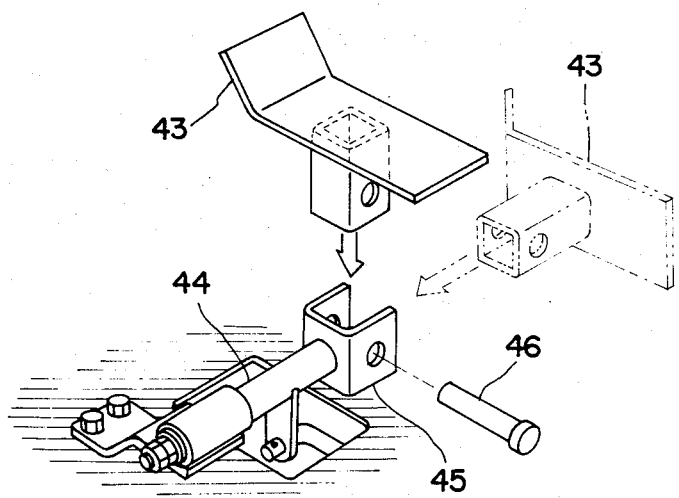
FIG. 8 is a developed perspective view of pedal mechanism.

Referring to FIG. 8, a pedal 43 is a control pedal for operating a service port of a valve for other loaders such as a crum-shell, which pedal is oscillated back and forth. A rotary shaft 44 extending transversely of the driver's cabin 6 carries at an end thereof a channel shaped bracket 45 opening away from the driver's seat 4. The pedal 43 is rigidly connected to the bracket 45 by a connecting pin 46. When the pedal 43 is not used, the pedal 43 is laid sideways away from the seat 4 locked in that position to the bracket 45 by the connecting pin 46 to be kept out of the way of the driver.

The cover 17 may be coated with the insulating mateial 40 over a back face thereof instead of the outer surface, or may be coated on both surfaces.

Instead of the expanded metal 42, a perforated metal be attached to the side wall 6A, or no such covering means may be provided thereby rendering the space S visible from outside through the opening 41. It will serve the purpose if the construction permits the heat of pressure oil to escape easily from the space S to the ambient.

This invention is applicable not only to illustrated earth moving vehicle having a backhoe implement but also to varied types of working vehicle such as one having a face shovel.

What is claimed is:

1. An earth moving vehicle, comprising:
   a moving device for running the earth moving vehicle;
   a swivel deck including an upper surface having front, rear and two side portions, said swivel deck being rotatably connected to the moving device relative to a vertical axis extending through the moving device;
   a motor section situated on the rear portion of the upper surface of the swivel deck, and
   a driver's cabin situated on the entire upper surface of the swivel deck except the rear portion for the motor section, said driver's cabin including a front wall, a rear wall, first and second side walls, said first wall having a first opening at a lower portion thereof, a second opening adjacent to the first opening and a lid for covering the second opening, said second side wall having a third opening and a lid for covering the third opening, said all walls being arranged substantially perpendicularly to the swivel deck, a driver's seat situated in front of the rear wall between the first and second side walls, an interior cover situated inside the driver's cabin adjacent the first side wall so that a space surrounded by the interior cover can be accessible through the first opening, said interior cover having a top surface which is located under the driver's elbow when a driver is seated on the driver's seat, a console box situated between the interior cover and the driver's seat and having a top surface located below the top surface of the interior cover, a battery case situated inside the driver's cabin adjacent the first side wall next to the interior cover so that a space surrounded by the battery case is accessible through the second opening which is closable by the lid for the second opening, said battery case having a top surface lower than the top surface of the interior cover, a fuel tank situated under the driver's seat and having a refilling port situated adjacent to the third opening of the second side wall, and a partition element attached around the refilling port and connected to the second side wall around the third opening so that the refilling port communicates with atmosphere outside the driver's cabin, whereby interior of the driver's cabin can be effectively utilized.

2. An earth moving vehicle according to claim 1, in which said interior cover includes a heat insulating material on a surface inside the driver's cabin.

* * * * *